E. F. NELSON.
VULCANIZING MOLD.
APPLICATION FILED FEB. 4, 1920.
1,397,447. Patented Nov. 15, 1921.
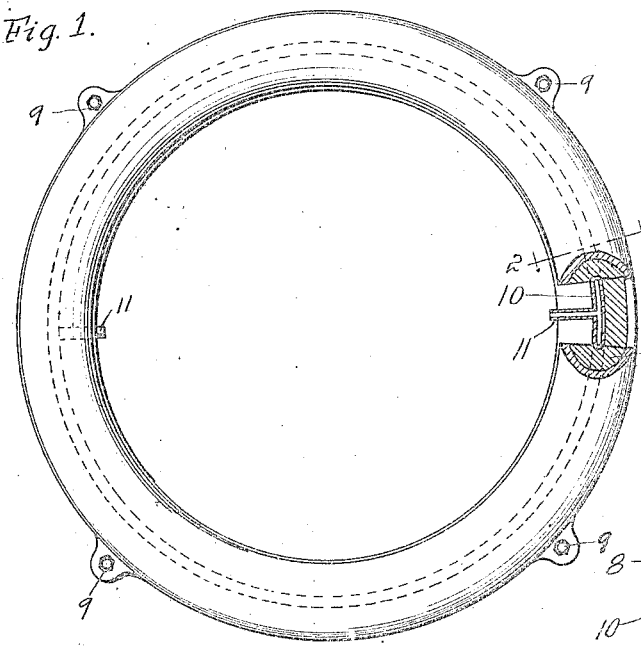
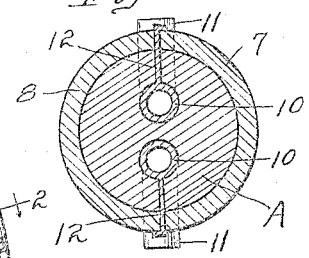
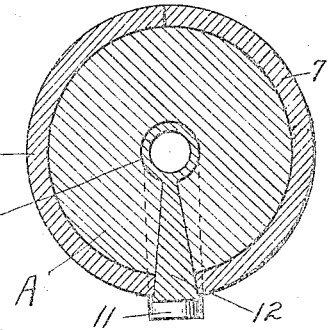
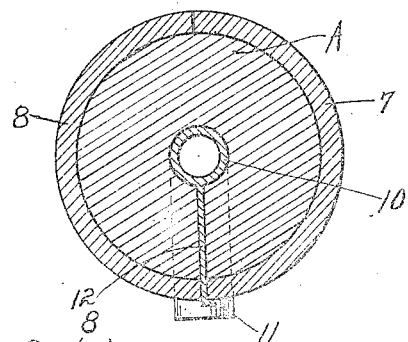
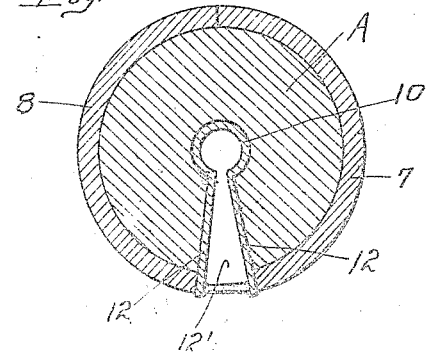
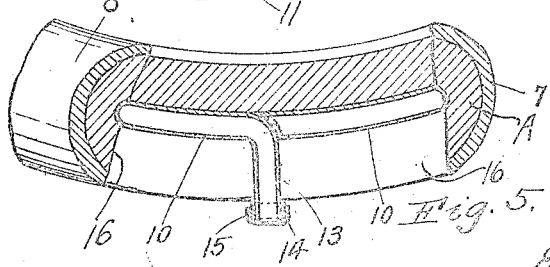
Inventor
Elmer F. Nelson

UNITED STATES PATENT OFFICE.

ELMER F. NELSON, OF CHICAGO, ILLINOIS, ASSIGNOR TO ARNOLD A. WEISS, OF ST. LOUIS, MISSOURI.

VULCANIZING-MOLD.

1,397,447.  Specification of Letters Patent.  Patented Nov. 15, 1921.

Application filed February 4, 1920. Serial No. 356,188.

*To all whom it may concern:*

Be it known that I, ELMER F. NELSON, a citizen of the United States, residing at Chicago, in the county of Cook and State of Illinois, have invented certain new and useful Improvements in Vulcanizing-Molds, of which the following is a specification.

My invention relates to molds for vulcanizing rubber and the like, and has for one of its objects the provision of simple and efficient means for introducing a heating medium into the interior of the rubber to be vulcanized, to facilitate vulcanizing the inner parts of said rubber.

A further object is the provision of a device particularly adaptable for vulcanizing tire fillers of the cushion type, in which the heating medium is brought into contact with both the interior and exterior of the rubber so as to facilitate an even vulcanization of such rubber.

Other objects will appear hereinafter, and with all such objects in view, my present invention resides in the novel features of form, construction, arrangement, and combination of parts hereinafter described and afterward pointed out in the claims.

In the accompanying drawing I have shown an embodiment of my invention in which—

Figure 1 is a side view of a vulcanizing mold embodying my invention, but having a portion broken away to expose underlying parts;

Fig. 2 is an enlarged section taken on line 2—2 of Fig. 1;

Figs. 3 and 4 are views similar to Fig. 2, but showing different arrangements of the parts for introducing steam or other heating medium into the interior of the tire;

Fig. 5 is a fragmental view, partly in section, showing a modified form of tube for introducing the heating medium into the interior of the tire; and Fig. 6 is a view similar to Fig. 2, but showing a plurality of tubes for introducing the heating medium into the interior of the mold.

By way of illustrating my invention I have indicated a portable vulcanizing mold suitable for vulcanizing cushion fillers for vehicle tires and the like. It will be understood that this mold during vulcanization is located within a heating or so-called vulcanizing kettle, and that the mold itself is capable of embodiment in vulcanizing various other comparatively thick articles which cannot be vulcanized evenly from the heat being applied to the outside only of the rubber.

Referring more particularly to the drawing, I have indicated a mold made up of a shell or housing comprising two separable parts 7 and 8. The parts 7 and 8, it will be understood, are arranged to give the rubber to be vulcanized its desired outer shape, and in the present embodiment, these housing or mold-forming sections 7 and 8 are each annular or ring-shaped in elevation and of substantially semi-cylindrical shape in cross-section, the sections 7 and 8 being adapted for coöperation and to meet at their side edges to inclose the rubber being vulcanized. It will also be apparent that this housing or shell may be made up of a fewer or greater number of parts when so desired. In the form shown I have indicated ears and bolts 9 for detachably or separably holding or locking the parts 7 and 8 together, but it will be understood that many other means may be employed for holding or locking these parts together without departing from my invention.

Disposed within the housing I indicate a hollow annular or ring-shaped member 10, which in the present instance is of tubular form, since it is easiest to conduct the steam or other heating medium through the tire filler in the elongated member or tube 10. The tube 10 is indicated as being disposed centrally of the parts 7 and 8 in Figs. 1, 2, 3, 4, and 5, but it will be understood that it is not essential that the tube be positioned in the center, but may be varied according to different requirements. In Fig. 6 I have shown two tubes 10 spaced apart indicating that as many or as few of these tubes 10 may be supplied as desired to obtain the proper vulcanization of the article vulcanized.

Attached to the tube 10 is a member 1 which is hollow and affords communication between the interior of tube 10 and the outside of the housing so that when the mold proper comprising or made up of said housing-sections is in the steam or other heating medium, such heating medium will pass through member 11 into the tube 10 and circulate in the latter to conduct heat to the interior of the rubber. Therefore, in vulcanizing with a device of this kind the heat penetrates the rubber both from the tube 10 and the housing 7—8. Since the heat can penetrate the rubber from both the interior and the exterior vulcanization will be more uniform and the time of vulcanization be reduced over where the rubber is to be vulcanized by heat from the outside only.

I preferably provide an annular member 12 which is attached to the tube 10 in some manner, either being formed integral or secured thereto, as desired. The member 12 extends out through the housing 7—8 and is clamped or locked between the parts 7 and 8 in a manner to hold the tube in desired position. In Figs. 1, 2 and 6 I have indicated the member 12 as being thin or of sheet material. In Figs. 3 and 4 I have indicated this member 12 as being wedge-shaped so that it will be apparent that this member 12 may be formed in many desirable shapes without affecting the operation of the device. In Figs. 1, 2, 3 and 6 I have indicated members 11 as the means for feeding the steam into tubes 10, while in Fig. 4 I have indicated the wedge-shaped member 12 as being hollow with a communication 12' between the tube 10 and the member 12 throughout the entire lengths of said members so that the heating medium is free to circulate in and out of tube 10 throughout the entire length of the latter.

In Figs. 1, 2, 3, 4 and 6 the tubes 10 are indicated as being of rigid construction, such as of metal. In Fig. 5 I have indicated the tube 10 as being of a flexible material, such as a fabric, felt, or other suitable material, with one end 13 of such flexible tube 10 bent and extending out through the outer side of the rubber being vulcanized and the housing 7—8. The flexible tube 10 in Fig. 5 may be in one piece and extend entirely around in the housing 7—8, or, it may be made in a plurality of lengths with an end of each length extending out, as suggested by the one end shown in Fig. 5, and one end of the next adjacent length disposed against the part 13, as indicated in Fig. 5. It will also be apparent that both ends of the flexible tube 10 in Fig. 5 may extend out through the rubber and housing 7—8 in the manner suggested by the one extending portion 13. I find it desirable to place a rigid band or ring 14 around the outer end of portion 13 and turn the end portion 15 of such flexible tube back over the ring 14 to keep the flexible tube from drawing into the rubber while the latter is being vulcanized.

In Figs. 1 to 4, inclusive, I have indicated the member 12 and hollow member 11 as extending radially toward the center of the housing 7—8, and in Fig. 5 I have indicated the portion 13 as extending radially out from the center of the housing 7—8. In Fig. 6 I have indicated these members 11 and 12 as extending radially, one toward the center and one extending away from the center of said housing. From this it will be apparent that the supply tubes 11 and spacing member 12 may extend out through the housing 7—8 in any desired direction to suit any particular requirements.

The rubber A indicated in the drawing which is to be vulcanized may be formed in a tubing machine, not shown, or in any other desirable manner and preferably formed with an opening corresponding to the outside of tube 10 and provided with a slit corresponding to the outside of member 12. When using a rigid tube 10 the part 12 is necessary to prevent the rubber from being vulcanized together and preventing the removal of tube 10. In the form shown in Fig. 5 where a flexible tube 10 is used the tube may be left in the rubber A when vulcanized, or, it can be removed as in the case of the rigid tube. Where the flexible tube 10 is to be left in the rubber A it is not necessary to prevent the edges 16 of the rubber A from being vulcanized together, therefore, no member corresponding to member 12 would have to be used. In forming the members 11 and 12 these parts may be formed integrally or secured together in any desirable manner, or, the parts 10, 11 and 12 may be formed integrally, if desirable.

I claim:—

1. A portable rubber vulcanizing mold for cushion tire-fillers and the like, the same including, in combination, a shell comprising a pair of rigid ring-shaped separable sections substantially semi-cylindrical in shape in cross-section, said sections being adapted for coöperation to approximately meet at their edges to substantially house the rubber to be vulcanized, the shell being adapted for location during vulcanization within a vulcanizing or heating kettle, a tubular member disposed within both the chamber formed by said sections and the rubber contained therein for vulcanization, said member having communication through said rubber with the exterior of the shell for conducting heating fluid from the kettle into the interior of the rubber being vulcanized within the shell for facilitating vulcanization of the interior of the rubber, means within the shell and rubber being vulcanized for channeling said rubber to permit ready removal of the tubular member after rubber vulcanization, and means for rigidly locking said sections detachably together in rubber housing coöperation, said heating fluid conducting-member being locked within the shell when said sections are so locked together in rubber housing coöperation.

2. A portable rubber vulcanizing mold for cushion-tire fillers and the like, the same including in combination, a housing comprising a pair of rigid ring-shaped separable sections substantially semi-cylindrical in shape in cross-section, said sections being adapted for coöperation to approximately meet at their edges to substantially inclose the rubber to be vulcanized, and the housing being adapted for location during vulcanization within a vulcanizing or heating kettle, a rigid tubular member disposed within the chamber formed by said sections and having communication with the exterior of the housing for conducting heating fluid from the kettle into the interior of the rubber being vulcanized within the housing for facilitating vulcanization of the interior of the rubber, means having engagement with said member and extending from said member outwardly between the meeting edges of the housing sections for channeling the rubber being vulcanized to permit removal of the hollow member after rubber vulcanization, and means for rigidly locking said housing sections detachably together in rubber inclosing coöperation, said heating-fluid conducting member and said channeling means being locked within the housing when its said sections are so locked together in rubber inclosing coöperation.

3. A portable vulcanizing mold for cushion-tire fillers and the like, the same including in combination, a housing comprising a pair of rigid ring-shaped separable sections substantially semi-cylindrical in shape in cross-section, said sections being adapted for coöperation to approximately meet at their edges to substantially inclose the rubber to be vulcanized, and the housing being adapted for location during vulcanization within a vulcanizing or heating kettle, a rigid annular tube disposed within the chamber formed by, and spaced from the walls of, said sections for conducting heating fluid from the kettle into the interior of the rubber being vulcanized within the housing for facilitating vulcanization of the interior of the rubber, an apertured annular spacing-member having communicating engagement with the interior of the tube and extending from the tube outwardly between the meeting edges of the housing sections, said spacing-member affording passage for heating fluid from the kettle into the tube and forming a channel in the rubber being vulcanized to permit removal of the tube from the rubber after vulcanization, and means for rigidly locking said housing sections detachably together in rubber inclosing coöperation said tube and said channeling means being locked within the housing when its said sections are so locked together in rubber inclosing coöperation.

4. A portable vulcanizing mold for cushion-tire fillers and the like, the same including, in combination, a housing comprising a pair of rigid ring-shaped separable sections substantially semi-cylindrical in shape in cross-section, said sections being adapted for coöperation to approximately meet at their edges to substantially inclose the rubber to be vulcanized, and the housing being adapted for location during vulcanization within a vulcanizing or heating kettle, a rigid annular tube disposed within the chamber formed by, and spaced from the walls of, said sections for conducting heating fluid into the interior of the rubber being vulcanized within the housing for facilitating vulcanization of the interior of the rubber, a rigid apertured annular spacing-member substantially wedge-shaped in cross-section disposed within the housing and having communicating engagement with the tube and extending from the tube outwardly between the meeting edges of the housing sections, said spacing-member affording passage for heating fluid from the kettle into the tube and forming a channel in the rubber being vulcanized to permit removal of the tube after vulcanization, and means for rigidly locking said housing sections detachably together in rubber inclosing coöperation, said tube and said channeling means being locked within the housing when its said sections are so locked together in rubber inclosing coöperation.

5. A portable vulcanizing mold for cushion tire-fillers and the like, the same including, in combination, a housing comprising a pair of rigid ring-shaped separable sections substantially semi-cylindrical in shape in cross-section, said sections being adapted for coöperation to approximately meet at their edges to substantially inclose the rubber to be vulcanized, and the housing being adapted for location during vulcanization within a vulcanizing or heating kettle, a rigid annular tube disposed within the chamber formed by, and spaced from the walls of, said sections for conducting heating fluid into the interior of the rubber being vulcanized within the housing for facilitating vulcanization of the interior of the rubber, a rigid annular spacing ring wedge-shaped in transverse section fixed at an edge to the tube and extending from the tube outwardly between the meeting edges of the housing-sections, said spacing ring having apertures leading from th exterior of the housing into the interior of the tube and affording passage for heating fluid from the kettle into the tube and forming a channel in the rubber being vulcanized to permit removal of the tube after vulcanization, and bolts engaging the housing-sections for rigidly fastening the same detachably together in rubber inclosing coöperation, said tube and said channeling ring being locked within the housing when its said sections are so locked together in rubber inclosing coöperation.

In testimony whereof I have signed my name to this specification on this 29th day of January, A. D. 1920.

ELMER F. NELSON.